Patented Nov. 27, 1934

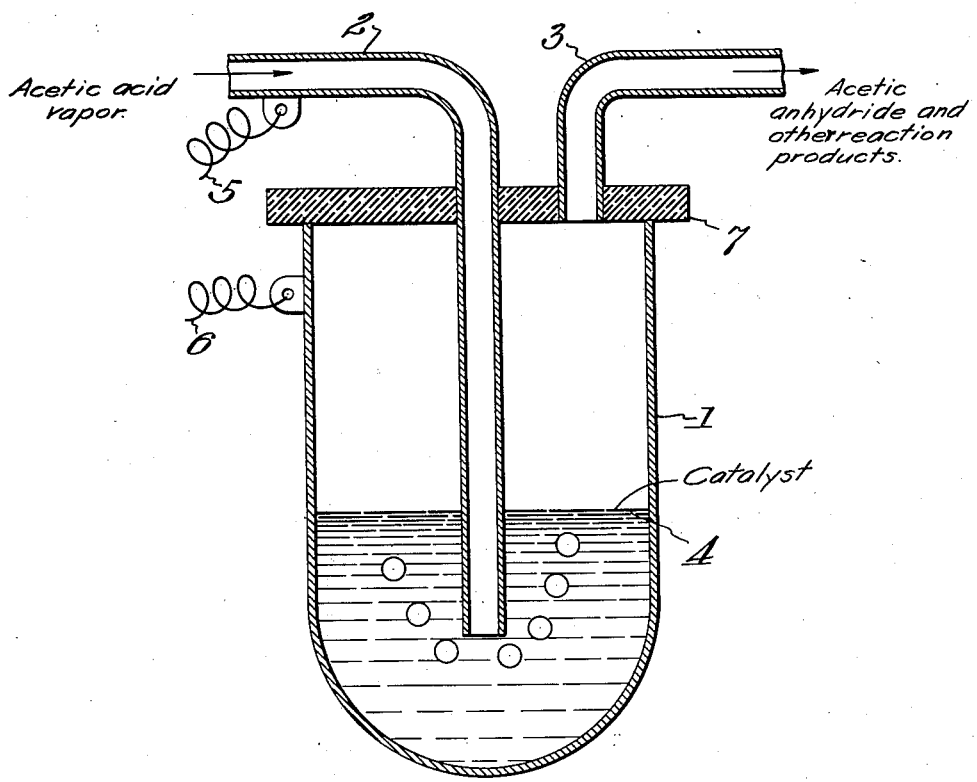

1,982,153

UNITED STATES PATENT OFFICE 1,982,153

PROCESS OF PREPARING ACETICANHYDRIDE

Alfred Dierichs, Leverkusen-on-the-Rhine, and Leonhard Weiss, Wiesdorf-on-the-Rhine, Germany, assignors to I. G. Farbenindustrie Aktiengesellschaft, Frankfort - on - the - Main, Germany, a corporation of Germany Application July 8, 1930, Serial No. 466,573
In Germany August 1, 1929

4 Claims. (Cl. 260—123)

The present invention relates to the manufacture of aceticanhydride by the catalytic decomposition of acetic acid.

It is known that acetic anhydride can be manufactured by leading acetic acid vapors over or through a catalyst containing phosphoric acid compounds as for instance molten phosphates, especially a molten mixture of sodium and lithium meta phosphate at temperatures between 500° C. and 1000° C. The reaction being an endothermic one the addition of heat is necessary.

According to the present invention the heat necessary for carrying out the reaction can be added by using the molten catalyst as resistance by putting it in an electric circuit. A simple form for carrying out the invention is to use the vessel containing the molten catalyst as one electrode and the tube by which the acetic acid vapors are introduced as the other electrode. It is evident that vessel and inlet tube are prepared from substances conducting an electric current as metals, alloys, coal, graphite, "Carborundum", chamotte-graphite and similar materials.

This new process has the advantage over all other processes used up to date, wherein the heat required is added from outside by means of gas, oil or electrical heating or by a process in which the vessel containing the molten catalyst is used as resistance, that the heat is generated at the same spot where it is also used for performing the reaction; a saving of heat resulting therefrom. Also the attack of the material of the vessel by high temperatures as results when heating from the outside is avoided to a far reaching extent.

The invention is illustrated by the following examples without being restricted thereto:

*Example 1.*—Into a copper crucible of 60 mm. diameter containing a molten mixture of equal parts (400 grams each of sodium meta phosphate and lithium meta phosphate) is introduced acetic acid vapor at a temperature of the melt of 640° C. by means of a copper inlet tube having a diameter of 20 mm. The tube reaches 25 mm. into the melt. The copper inlet tube is one electrode and the copper crucible the other electrode; the circuit having a voltage of 9.6 volts alternating current; the internal current being about 150 amperes. The yield of anhydride, containing only traces of phosphoric acid and organic compounds of phosporus being 50–60% of the theory.

*Example 2.*—Into a crucible of chromium nickel steel of the Krupp A. G. (V₄A) see German Patents Nos. 304,126, 304,159, 395,044, 399,806 of 160 mm. diameter containing a molten mixture of 1 part by weight of sodium meta phosphate, 1 part by weight of lithium meta phosphate and 1 part by weight of borylphosphate (boronphosphate $B_2O_3 \cdot P_2O_5$) is introduced into the melt having a temperature of about 700–750° C. acetic acid vapor at a temperature of about 620° C. is introduced by means of an inlet tube of V₄A-steel dipping 50 mm. into the molten catalyst. Inlet tube and crucible form the electrodes. Alternating current is used the voltage being 28–35 volts at 100–150 amperes. The yield and purity of the acetic anhydride produced are equal to those of Example 1. The addition of boronphosphate not only prolongs the life period of the catalyst but raises also the specific resistance of the melt. As a result a higher amperage can be used.

In the annexed drawing the single figure is a vertical section of an apparatus suitable for performing the invention. In the drawing 1 represents the crucible which is at the same time one electrode; 2 is the acid inlet tube and second electrode; 3 is the outlet tube; 4 is the catalyst; 5 and 6 represent means for supplying current, and 7 represents a crucible lid made from a suitable non-conducting material. In the usual manner of operating the apparatus the desired voltage is impressed across the crucible and inlet pipe, and acetic acid vapors are introduced through the pipe 2 as soon as the catalyst 3 is sufficiently hot. The gaseous reaction products escape through the outlet pipe 3.

We claim:

1. A process of preparing acetic acid anhydride by the catalytic decomposition of acetic acid vapor, which comprises conducting said acetic acid vapor through a molten catalyst comprising an alkali metal phosphate, which catalyst is arranged as a resistance in an electric circuit and thus maintained at a temperature between 500 and 1000° C. by an electric current.

2. A process of preparing acetic acid anhydride by the catalytic decomposition of acetic acid vapor, which comprises conducting said acetic acid vapor through a molten catalyst comprising an alkali metal phosphate and boron phosphate, which catalyst is arranged as a resistance in an electric circuit and thus maintained at a temperature between 500 and 1000° C. by an electric current.

3. A process of preparing acetic acid anhydride by the catalytic decomposition of acetic acid vapor, which comprises conducting said acetic acid vapor through a molten catalyst comprising sodium phosphate and lithium phosphate, which catalyst is arranged as a resistance in an electric circuit and thus maintained at a temperature between 500 and 1000° C. by an electric current.

4. A process of preparing acetic acid anhydride by the catalytic decomposition of acetic acid vapor, which comprises conducting said acetic acid vapor through a molten catalyst comprising sodium-meta-phosphate, lithium-meta-phosphate and boron-phosphate, which catalyst is arranged as a resistance in an electric circuit and thus maintained at a temperature between 500 and 1000° C. by an electric current.

ALFRED DIERICHS.
LEONHARD WEISS.